Feb. 28, 1950     N. A. ESPEGREN     2,498,916
GASKET UNIT FOR SWIVEL CONNECTIONS
Filed Feb. 2, 1948
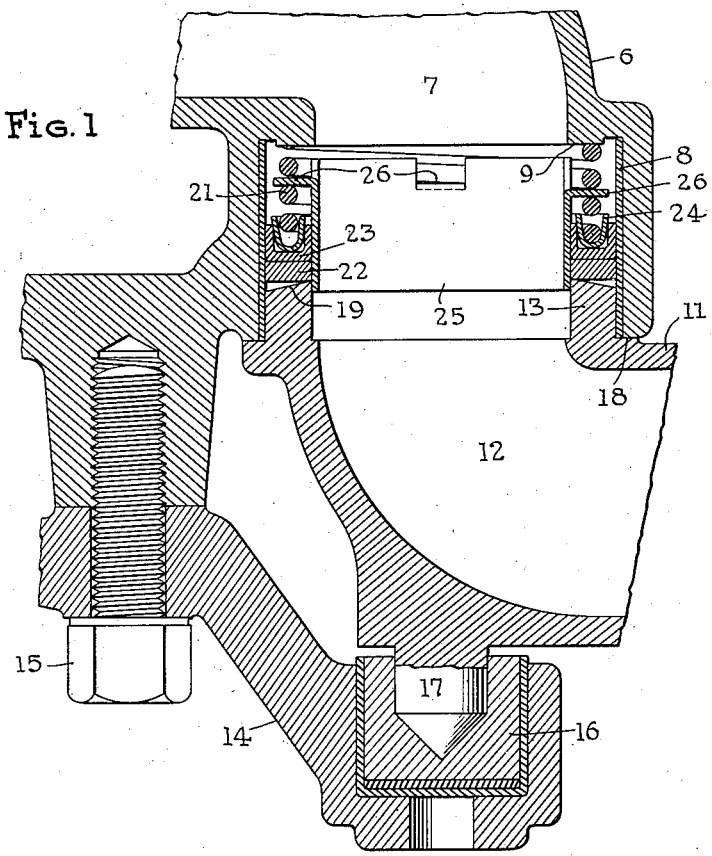
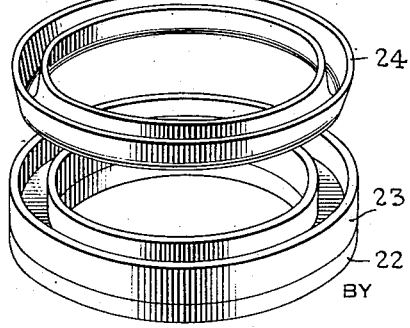
INVENTOR.
Nels A. Espegren
BY
ATTORNEYS.

Patented Feb. 28, 1950

2,498,916

UNITED STATES PATENT OFFICE 2,498,916

GASKET UNIT FOR SWIVEL CONNECTIONS

Nels A. Espegren, Omaha, Nebr.

Application February 2, 1948, Serial No. 5,732

2 Claims. (Cl. 285—96.8)

This invention relates to gaskets for swivel joints for steam lines and other pressure conduits.

To connect steam lines between successive railway cars in a train recourse has been had to connectors which must swing through a considerable angle and therefore require a steam tight swivel joint. The joint customarily used comprises a cylindrical nipple which fits and turns in a cylindrical socket and is sealed by a gasket forced against the end of the nipple and the interior of the socket by a coil compression spring confined in the socket. The spring reacts on a substantially rigid shouldered sleeve or thimble which confines the gasket.

Leakage of steam is wasteful and in freezing weather can become the source of annoyance and even danger to passengers and crew because of the formation of fog and deposition of frost. Vibration, motion due to slack action between cars, and rough handling, tend to cause severe wear.

The present invention provides an improved gasket assembly, in which a channel-shaped annular gasket is spread by a wedging spring seat engaged by the spring, above described.

A preferred embodiment will now be described by reference to the accompanying drawing in which:

Fig. 1 is a fragmentary view in axial section showing a conventional swivel joint with the improved gasket assembly in place.

Fig. 2 is an exploded perspective view of the components of the gasket assembly.

Refer to Fig. 1. The socket member of the swivel joint is indicated generally by the numeral 6. It has a steam passage 7 leading to the socket which has a bushing 8 forming the wearing surface of the socket proper and a shoulder 9 which serves as a spring seat.

The nipple member of the swivel joint is generally indicated by the numeral 11 and has a steam passage 12 which communicates through the end of nipple proper 13 with the interior of socket bushing 8 and thus with passage 7 in member 6.

A bracket 14 is releasably secured to socket member 6 by means including a machine screw 15 and carries a thrust bearing 16 which receives pivot lug 17 formed on member 11. The axes of lug 17 and nipple 13 coincide and the nipple has a shoulder 18 seating on the socket member 6, so that nipple 13 turns smoothly in socket bushing 8. The end 19 of nipple 13 is beveled as indicated and the packing structure which is seated on end 19 is loaded by a coil compression spring 21 seated on shoulder 9.

The parts so far described will be recognized as conforming in detail to past practice. According to the present invention the gasket is made in two parts, a flat annulus 22 and channel-shaped annulus 23, both of flexible composition. The annulus 22 rests on the beveled end 19 of the nipple 13, and the annulus 23 is superposed with its channeled side remote from annulus 22.

An annular spring seat 24 engages in the channel of annulus 23. The spring seat is desirably a sheet metal stamping U-shaped in cross section, the sides of the U being flaring (see Fig. 1). The lower end of spring 21 seats in the groove of spring seat 24 and presses the spring seat into the channel of gasket 23 wedging its flanges apart.

One flange is thus caused to seal with socket bushing 8. The other engages a sleeve 25 not used in prior art swivel joints. The sleeve 25 makes a good telescoping fit in the bore at the end of nipple 13, and confines the gaskets 22 and 23, so that they cannot spread inward.

Some means must be provided to retain sleeve 25, and in the illustrated embodiment the upper end of the sleeve is slitted to free lugs which are bent outward. These lugs 26 are located in a helix so as to engage between two successive convolutions of spring 21.

The sleeve retains and centers the gaskets, protects the gaskets from the scouring action of flowing steam and shrouds the spring, so that eddying of flowing steam is minimized.

The improved gasket assembly is readily substituted for those at present in use, affords a tighter seal, and has a longer useful life.

What is claimed is:

1. A sealing unit for use in a swivel joint of the type in which a bevel-ended tubular nipple swivels in a cylindrical socket, and is sealed by a gasket held against the end of the nipple and against the wall of the socket by a coil compression spring, said unit comprising, a flat annular gasket of flexible material dimensioned to fit against the end of said nipple; an overlying annular gasket of flexible material and of channel cross section; an annular metallic spring seat mounted in the channel of the last named gasket, said spring seat having a U-shaped cross section with flaring sides, whereby when loaded by the spring seated therein it tends to spread the channel gasket; a sleeve dimensioned to telescope into the end of the tubular nipple and extend within the spring and spring-seat and gaskets to center the gaskets and sustain the inner flange of the channel gasket; and means for yieldingly retaining said sleeve in position.

2. The combination defined in claim 1 in which the means for retaining the sleeve comprise outward projections on the sleeve which enter between successive convolutions of the spring.

<div style="text-align:right">NELS A. ESPEGREN.</div>

REFERENCES CITED

The following references are of record in the file of this patent:

UNITED STATES PATENTS

| Number | Name | Date |
|---|---|---|
| 1,548,333 | Scott | Aug. 4, 1925 |
| 1,870,036 | Bruce | Aug. 2, 1932 |